(12) United States Patent
Seefeldt et al.

(10) Patent No.: US 7,038,683 B1
(45) Date of Patent: *May 2, 2006

(54) AUDIO DRIVEN SELF-GENERATING OBJECTS

(75) Inventors: Alan Seefeldt, Santa Cruz, CA (US); Alan Peevers, Santa Cruz, CA (US)

(73) Assignee: Creative Technology Ltd., Creative Resource (SG)

( * ) Notice: Subject to any disclaimer, the term of this patent is extended or adjusted under 35 U.S.C. 154(b) by 0 days.

This patent is subject to a terminal disclaimer.

(21) Appl. No.: 09/566,586

(22) Filed: May 8, 2000

Related U.S. Application Data

(60) Provisional application No. 60/178,990, filed on Jan. 28, 2000.

(51) Int. Cl.
*G06T 15/00* (2006.01)

(52) U.S. Cl. ...................................................... 345/473
(58) Field of Classification Search ................ 345/422, 345/419, 473; 704/235
See application file for complete search history.

(56) References Cited

U.S. PATENT DOCUMENTS 5,608,839 A * 3/1997 Chen ......................... 704/235
6,448,971 B1 * 9/2002 Seefeldt et al. .............. 345/475

FOREIGN PATENT DOCUMENTS

WO    WO 94/22128    * 9/1994

OTHER PUBLICATIONS

Foley, 1996, Computer Graphics Principles and Practice, $2^{nd}$ edition, 296–299.*

* cited by examiner

*Primary Examiner*—Almis R. Jankus
(74) *Attorney, Agent, or Firm*—Blakely, Sokoloff, Taylor & Zafman LLP

(57) ABSTRACT

An apparatus and method for generating 3D graphics objects utilizes algorithms to generate the objects when driven by audio events. In one embodiment a "hydra" object has branches that are recursively generated. Parameters used to algorithmically generate the object are controlled by a control signal driven by detected events in an audio signal. Additional algorithms include a phase plot using audio parameters. A generalized system includes an audio analysis block for generating audio control signals utilized by object generation, objects selection and object placement blocks to generate 3D objects.

9 Claims, 3 Drawing Sheets

US 7,038,683 B1

AUDIO DRIVEN SELF-GENERATING OBJECTS

CROSS-REFERENCES TO RELATED APPLICATIONS

This application claims the benefit provisional Application No. 60/178,990, filed Jan. 28, 2000, the disclosure of which is incorporated herein by reference.

BACKGROUND OF THE INVENTION

Internet music has created great interest in techniques for creating visualization of music. Such visualizations are currently being provided, for example, by the LAVA player distributed by the assignee of the present application, and by plug-ins for the WinAmp player.

Various techniques are used to create the visualization including displaying harmonic analysis of the music, displacing or deforming 3D graphic objects based on events detected in the music, and displacing and distorting textures mapped to 3D images.

A system disclosing visual effects primarily consisting of modifying an existing set of vertices is disclosed in commonly assigned, co-pending application Ser. No. 09/373,405, filed Aug. 12, 1999, entitled "Audio Driven Visual Representations," which is hereby incorporated by reference for all purposes. While powerful, there is a broad class of visual effects which cannot be realized this way.

Accordingly, new techniques for creating music visualization are of great interest and importance in the internet music field.

SUMMARY OF THE INVENTION

According to one aspect of the invention, a music visualization system analyzes audio signals and creating dynamic 3d visualizations in response to this analysis. These new effects can be classified "generative", since they are generated during each animation frame in response to some small number of parameters extracted via the audio analysis.

According to another aspect of the invention, an algorithm utilizes extracted parameters to generate a series of vertices defining 3D objects and generating polygons to fill in spaces between successively generated 3D objects to create a branch.

According to another aspect of the invention, child branches are recursively formed from a parent branch.

According to another aspect of the invention, audio parameters are utilized as coefficients of a linear combination of sinusoidal functions. The combination is sampled and the samples are utilized as parameter by a generative algorithm.

According to another aspect of the invention, an audio analysis block provides extracted audio parameters to an object generation, an object selection block, and an object placement block which utilize the parameters to generate objects, select generated objects, and position selected objects in a 3D scene.

Other features and advantages of the invention will be apparent in view of the following detailed description and appended drawings.

DESCRIPTION OF THE SPECIFIC EMBODIMENTS

FIRST EMBODIMENT

An embodiment for creating a specific generative object, called a "Hydra," will now be described. The "Hydra" grows tapered tentacles that curl, taper, and sway according to audio parameters. The hydra is a recursive structure, with each recursion creating a single branch of the tree-like structure. Each branch is realized using a series of circular hoops which form a cylindrical shape when polygons are used to fill in the spaces between the hoops.

Figure 1:
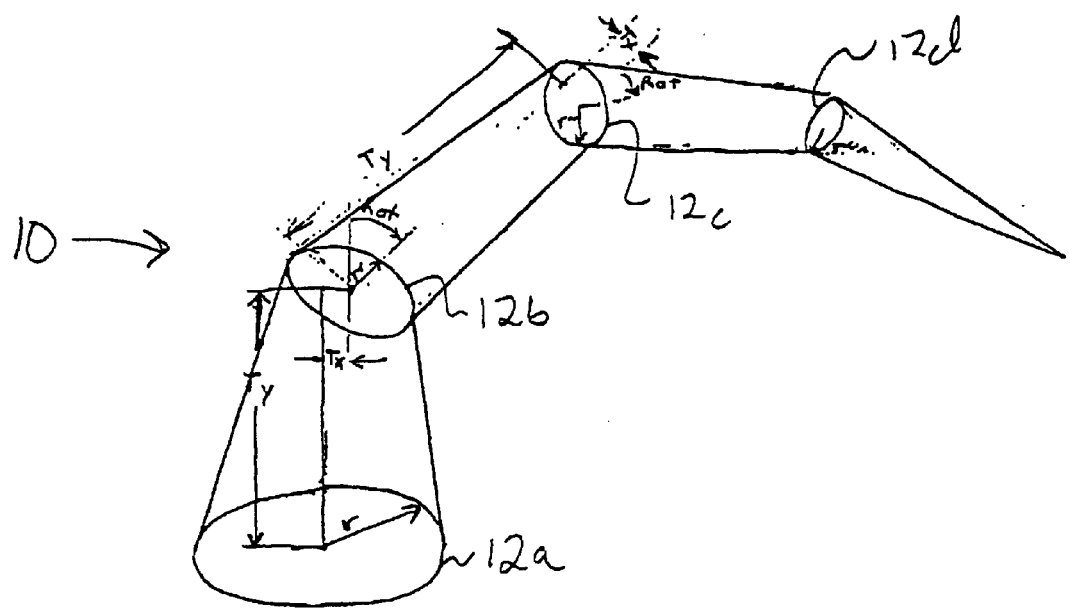
FIG. 1 is a schematic diagram illustrating the generation of an algorithmic object.

FIG. 1 shows a single branch 10 including the hoops 12 which comprise it. The following parameters describe the geometric properties of a single branch:

Rot—The angle of rotation between two successive hoops.

Sc—The amount to scale the radius by before rendering the next hoop.

Szthresh—This branch is complete when it's radius is <Szthresh.

Tx—The amount by which to translate in the x-direction between two hoops.

Ty—The amount by which to translate in the y-direction between two hoops.

Tz—The amount by which to translate in the z-direction between two hoops.

Nsegs—The maximum number of segments this branch may contain.

As can be seen, these parameters all determine a matrix transformation which is applied between generating a pair of successive hoops along the branch. Through a combination of translation, rotation, and scaling, a variety of interesting curved branches can be obtained. Typically, Sc will be somewhat less than 1.0, so that successive hoops have decreasing radii. Once the radius is less than Szthresh a cone is placed on the end, giving the branch a pointed tip. Note that values of Sc greater than 1.0 will lead to an ever-increasing branch radius (and the branch will terminate via comparison with Nsegs). Note that these geometric transformations are all accomplished using a standard 4×4 matrix and a matrix stack to keep track of the transformation context at each stage. For more information on matrix stacks, see any reference book on OpenGL programming techniques (e.g. "*OpenGL Programming Guide*," OpenGL Architecture Review Board, Addison Wesley, 1993, pp 102–4).

Referring back to FIG. 1, the radii of successive hoops 12a, b, and c are r, r', and r", where r'=r*Sc and r"=r'*Sc=r*Sc$^2$. Also, r"<SzThresh<=r'", so that the total number of segments in this branch is limited to 4 by the size threshold. Also note that Rot, Tx, Ty, and Tz all operate relative to the coordinate system of the previous hoop, so these values accumulate.

Figure 2:
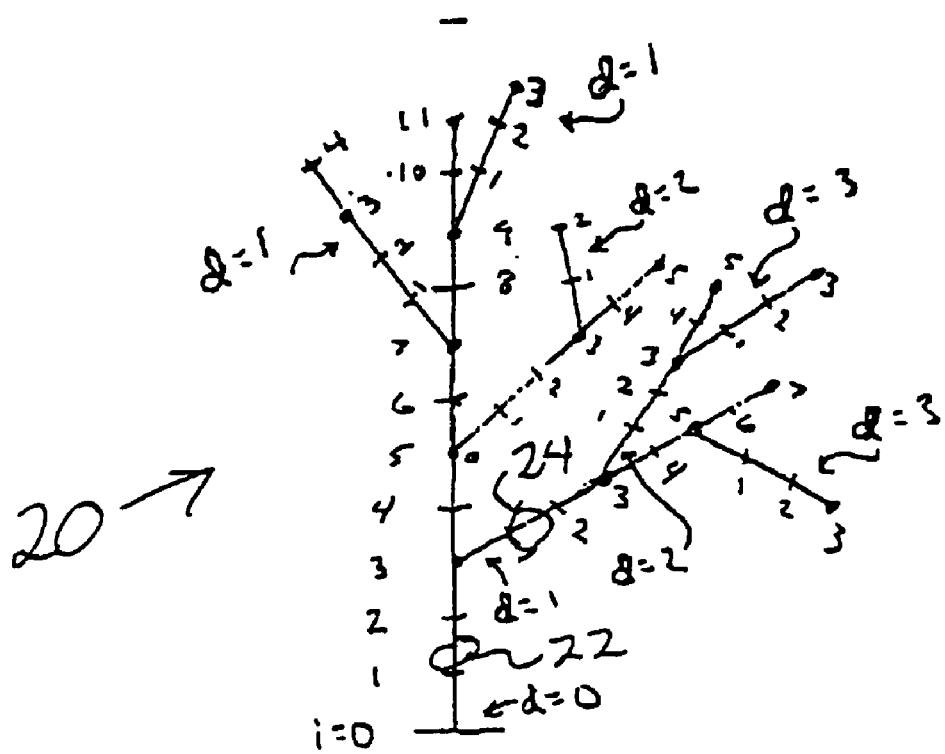
FIG. 2 is a tree diagram depicting a recursive algorithm for generating child branches of parent branches.

To add more interesting structure to the shape, a recursive scheme is employed to render multiple branches. As a single branch is being rendered, child branch recursions are called, each of which in turn renders another branch (possibly with descendants of their own). The parameters which control the recursion are:

SpawnStart—The hoop iteration at which a the 1$^{st}$ child of this branch is spawned SpawnFreq—Once SpawnStart is reached, start children every SpawnFreq hoops Lev—The index of this branch. Each branch has a unique index Maxlev—The maximum number of branches Depth—The recursion depth of this branch MaxDepth—The maximum recursion depth BranchRot—The angle of rotation between the parent and child branches FIG. 2 illustrates most of these parameters. Rather than draw the hoops, the tree structure 20 is represented schematically as a numbered series of segments, where each segment represents two successive hoops. The actual shape of the tree will depend on the transformation parameters described above.

In FIG. 2 the first branch is the vertical branch 22. In this example, the $1^{st}$ child of any given branch starts after SpawnStart (3, in this example) hoops have been rendered. Thus, in this example, the first child branch 24 is generated at the 3d segment of the vertical branch 22. Thereafter, a child is spawned every SpawnFreq (2, in this example) hoops. If SpawnFreq were only 1, a child would have been grown at every hoop, resulting in a very dense clustering of branches. BranchRot controls the angle at which a given child branch will branch off from its parent (it's not shown accurately in this schematic drawing).

This embodiment does a depth-first recursion, so children spawn grandchildren, and so on, until either a) the recursion level d reaches MaxDepth (3, in the example of FIG. 2), or the radius of a branch is less than SzThresh. In this example, Maxlev is 8, so only 8 branches are rendered, regardless of SzThresh.

It is important to realize how the matrix stack is used to save ("push") the transformation context before beginning a new child. Once the child and all of its descendants have been rendered, the matrix stack is "popped ", thereby restoring the geometry to that point on the parent branch from whence the child sprouted.

Thus, in FIG. 2 all child branches of the first branch 24 would be rendered before the vertical branch 22 would be extended beyond the 3d segment of the vertical branch 22. As is depicted in the FIG. 2 the first branch stops branching at the 3d level of recursion (d=3). The context for the vertical (parent) branch at the 3d segment was "pushed" when the first branch 24 was initiated and is "popped" to return the context back to the vertical branch at the 3d segment. The vertical branch is the extended two more segments to the 5th segment and another child branch sprouts.

To add some randomness to the objects which are drawn, the rotation angle between hoops (Rot in the above discussion) can be modified by adding in a random variable from one segment to the next. This makes the branches less smooth, by introducing "kinks" into the otherwise continuously curved branch. To implement this, an extra rotation matrix J is used.

The following code shows the complete data structure for a C++ class which implements the preferred embodiment.

```
class Hydra {
public:
        Hydra();                          // Hydra constructor
        ~Hydra();                         // destructor
        void updateRotationMatrix();      // update N by applying rotation about {1,1,1}
        void transformPt(GLfloat *pt);    // apply M to pt[]
        void push();                      // save M on stack
        void pop();                       // restore M from stack
        void rotatez(GLfloat);            // apply rotation about z-axis to M
        void jiggle(int i);                       // apply rotation given by jiggle matrix J to M
        void rotate();                            // apply rotation given by N matrix to M
        void translate();                         // apply translation {tx,ty,tz} to M
        void ComputeDeformation();
        void ComputeVerts(GLfloat r);     // compute the vertices for one arm. Calls itself for child arms.
        void ComputeNormals();            //
        void InitTexture();
        void Draw();                              // render this hydra for this frame
        GLfloat rot;                              // rotation (about 1,1,1) after each seg
        GLfloat branchrot;                // rotation away from parent for each new arm
        GLfloat tx;                       // x-translation after each segment
        GLfloat ty;                       // y-transl after each
        GLfloat tz;                       // z-transl after each
        GLfloat *rotp;                            // pointer to parm that modifes rot
        GLfloat *txp;                             // ptr to parm that modifies tx
        GLfloat *typ;                             // ptr to parm that modifies ty
        GLfloat *tzp;                             // ptr to parm that modifies tz
        GLfloat *scp;                             // attach this to the filterbank!
        int spawnstart;                           // the segment after which we start spawning children
        int spawnfreq;                            // the rate at which we spawn them. smaller means more often.
        GLfloat szthresh;                 // the radius below which we end the recursion in ComputeVerts()
        GLfloat sc;                               // scale factor to apply after each segment ('taper')
        int numdef;                               // num of deformations to apply
        int docompdef;
        int docompnorm;
        HydraDef **deformation;           // list of deformations to apply
        GLfloat size;                             // size of this hydra
        GLfloat maxdefamp;                // max deformation amplitude
        int nx,ny;                        // each arm of this hydra is nx by ny vertices
        GLfloat Stack[MAXARMS][4][4];             // my matrix stack, for pushing and popping 'M'
        int top;                                  // pointer to top of stack
        GLfloat M[4][4];                          // transformation matrix
        GLfloat N[4][4];                          // rotation matrix
```

```
        GLfloat translation[3];                     // initial translation of this hydra
        GLfloat rotation[4];                        // initial rotation of this hydra
        GLfloat colormin[3];                        // min color
        GLfloat colordiff[3];                       // computed in Constructor as diff betw colormin and color
        GLfloat *color;                             // read from file
        GLfloat *specular;                          // pointer to specularity entry of param data struct
        GLfloat *shininess;                         // ptr to shininess entry of parm data struct
        GLfloat ****vpt;                            // list of 2-d vertex arrays. 1 list member per arm.
        GLfloat ****vnormal;                        // associated normal vectors.
        int    lev;                                 // lev indexes the above 2 lists.
        int    depth;                               // level of recursion we are in (in ComputeVerts).
        int    maxdepth;                            // max levels of recursion to descend (affects 'bushy<—>spindly' quality).
        int    nsegs[MAXARMS];                      // number of levels in each arm
        int    maxlev;                              // max number of levels
        int    dotex;                               // true if we are doing textures
        GLuint texid;                               // the texture to apply
        GLfloat texrepx;                            // number of times to repeat texture in x
        GLfloat texrepy;                            // num times to rpt texture in y
        GLfloat *texrepxscale;                      // ptr to parm struct member to scale the number of times to rept texture in x
        GLfloat *texrepyscale;                      // ptr to parm struct memb to scale the num times to repeat texture in y
        GLfloat ***vtexcoord;                       // 2-d array of texture coords each being 2 elements (u,v)
        GLfloat normdir;
        int     resettexture;
        int     resetcolor;
private:
protected:
};
```

This implementation uses the CompteVerts( ) function to compute all branch vertex positions recursively, one call per branch, until all branches that are active for this animation frame have been computed. Once the recursion completes, a separate Draw( ) routine is called to render the vertices so computed.

The array stored in ****vpt contains a list of 2d vertices, one per branch. More precisely, *vpt is a pointer to a vertex {x, y, z}, vpt is an array of these vertices comprising a single hoop, *vpt is an array of hoops, comprising a single branch, and **vpt is an array containing all the branches. Similarly, **vnormal contains all the normal vectors, each of the form $\{n_x, n_y, n_z\}$. $n_x$ is the x-component of the normal vector of a single vertex. Normal vectors are typically used to compute realistic lighting effects.

EXTENSIONS TO THE FIRST EMBODIMENT

Rather than use circular hoops as the elements which are connected together to form a closed tube, it is possible to morph between basic shapes (e.g. square, star, triangle, octagon, etc) as a branch is grown, giving the tube a cross-section that varies along it's length. It is also possible to create similar shapes where each hoop is replaced by a complete spatial primitive, such as a sphere, cube, or other more general model. By allowing these primitives to remain spatially disjoint, complex systems of shapes can be evolved, still using the underlying recursion and affine transformation techniques described above. Again, the primitives can be changed as the recursion is executed. For example, the "tree" may start as a series of cubes, but as successive "branches" are calculated, the primitive may morph to spheres, then tetrahedra, and finally toruses.

Another extension of this technique involves the addition of a render flag to each hoop. In this way, it is possible to, for example, to render only those branches whose radii are less than a specified radius. The effect is a cluster of wispy branches floating in space (not connected to any parent structures).

MAPPING TO AUDIO

Typically, some parameters of the audio analysis (as disclosed in a commonly assigned patent application entitled AUDIO-DRIVEN VISUAL REPRESENTATIONS, Ser. No. 09/373,405, filed Aug. 12, 1999 which is hereby incorporated by reference for all purposes) are used to drive the following parameters: Tx, Ty, Tz, Sc, Rot, and J (the "jiggle" matrix). By using the outputs of the transient detectors and animation function generators already described in the above-referenced patent application, very interesting dynamic behavior can be created which makes the object appear to dance to the music.

From the preceding, it should be clear that the description does not limit the approach. For example, rather than using a series of hoops to create quasi-cylindrical tree branches, discrete arbitrary 3D objects could be rendered at each segment instead (as mentioned above).

ALTERNATE EMBODIMENT

In the preceding embodiment, a recursive algorithm was used to generate the object's underlying structure. An alternative to this relies on the use of several oscillators to create a sinusoidal signal which is then displayed using a phase plot, where vertex positions are taken directly from three time-lagged measurements of the non-harmonic signal.

There are typically three independent outputs from the animation function generator, one each for bass, midrange, and treble band analyzer outputs. A simple signal can be formed using a weighted sum of three sinusoidal oscillators, as follows:

$$S = a_1 \sin(f_1) + a_2 \sin(f_2) + a_3 \sin(f_3)$$

The three weighting coefficients $a_1$ are typically provided by the audio analysis (via smoothed control functions), while the frequencies can be selected by the user or the scene designer. For each animation frame, three values are chosen from the most recent N samples of S, where N=fs/Fr, Fs is the audio sample rate, and Fr is the animation frame rate. For example, if the sample rate is 48000 and the animation frame rate is 48 Hz, then N=1000. These three samples are each separated by a constant lag factor l and are used to create the 3 coordinates for a single 3D vertex, as in:

$V_x=S[n];$
$V_y=S[n-l];$
$V_z=S[n-2l];$

Subsequent vertices are computed by observing the three lags at a different starting position in the buffer containing the samples of S:

$V'_x=S[n+a],$
$V'_y=S[n-l+a];$
$V'_z=S[n-2l+a];$

If a is 1, the vertex positions will sample the behavior of S at every value, creating a smooth trajectory in 3-space if the vertices are all connected using a polyline. Higher values of a sample S progressively more coarsely, trading off accuracy for computational requirements. By choosing appropriate values for $f_1$, $f_2$, and $f_3$, visually compelling imagery can be generated using very low-complexity algorithm to compute the vertex data.

Typically a more visually interesting connection than a polyline is used to connect the vertices generated by the phase plot. One example is to use a cylindrical shape to connect successive vertices. This is done by generating a hoop at the starting vertex, oriented perpendicularly to the vector that points from this vertex to the next. By connecting a series of these cylinders together, an elegant tubular object with properties that correlate strongly with the audio input can be generated.

GENERALIZED EMBODIMENT

Figure 3:
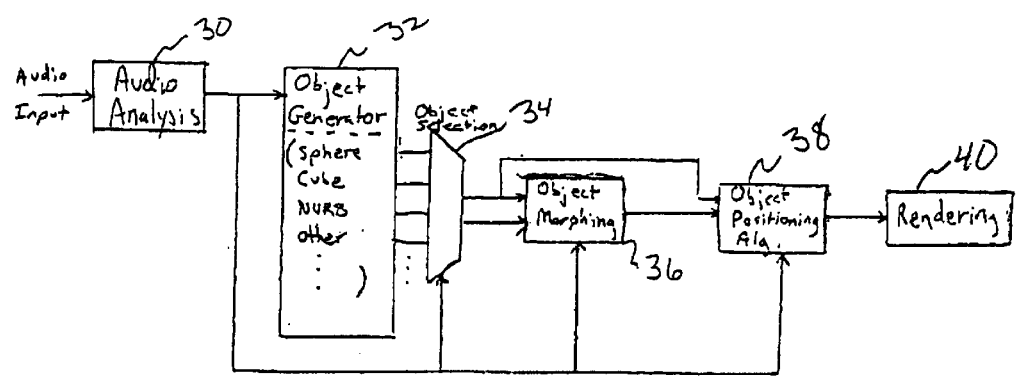
FIG. 3 is block diagram of a system for algorithmically generating an rendering 3D graphic objects.

The most general realization of the ideas presented above is illustrated in FIG. 3. Here, the audio signal passes through an analysis block 30, producing a small number of analysis parameters which are fixed for the duration of an animation frame. The production of analysis parameters is described in the above-referenced patent application. The output of the analysis block 30 is input to an object generator block 32, an object selection block 34, an object morphing block 36, and an object positioning algorithm block 38. The output of the object positioning block is input to a rendering block 40. It is to be understand that various combinations of the blocks depicted in FIG. 3 may be used in an actual system.

The analysis parameters output from the audio analysis block 30 can be used by the object selection block to select objects from a collection of parametrically generated objects generated by the object generator block 32. Such objects include, but are not limited to: spheres, cubes, tetrahedra, toruses, cones, cylinders, surfaces of revolution, and NURBS surfaces. The use of parametric objects allows objects to have a geometry which is partially or totally controlled by the audio analysis parameters input to the object generator block 32. The selection mechanism implemented by the selection block 34 can be as simple as stepping through the sequence of available objects at a rate determined by the audio analysis, or as complex as choosing objects based on the spectral characteristics of the incoming audio. The output of the selection block 36 is a series of vertex lists (one per object) which are each positioned somewhere in the 3d scene according to an object positioning algorithm implement by the object positioning block 38.

This positioning algorithm can be as simple as placing successive objects along a straight line, with the object spacing determined by the audio, or as complex as the recursive algorithm used to compute hoop positions above. The number of objects generated, as well as the specific object placement, can both be functions of the audio analysis parameters.

The result of the object generation and object placement steps is a cluster of objects which move from frame to frame according to the object positioning algorithm, and are shaped according to the parametric object generation algorithm. Object generation, selection, and positioning can all be affected by the audio analysis. The rendering block handles drawing these objects into the frame buffer. The use of parametric objects allows objects to have a geometry which is partially or totally controlled by the audio analysis parameters.

With the simple addition of the object morphing block 36 (which in turn just produces an output vertex list that is linearly interpolated between it's two input vertex lists), a set of objects can be generated which vary smoothly between object A (e.g. "sphere") and object B (e.g. "tetrahedron"). In order to use the morphing technique in this embodiment, all objects that are input to the morphing block must have the same number of vertices, so a one-to-one interpolation can be performed.

In the preferred embodiment audio analysis is performed by a digital signal processor or digital signal processing software stored in memory and executed by a computer. Shape generation, selection and placement is performed by program code stored in a computer memory and executed by the computer.

The invention has now been described with reference to the preferred embodiment. Alternatives and substitutions will now be apparent to persons of skill in the art. Accordingly, it is not intended to limit the invention except as provided by the appended claims.

What is claimed is:

1. A method for generating a 3D graphic object comprising the acts of:

analyzing a segment of an audio signal to extract time varying audio parameters from the signal;

providing said audio parameter to an object rendering algorithm;

executing the object rendering algorithm to recursively generate a 3D object based on different time varying values of provided audio parameters;

rendering said 3D object on a display.

2. The method of claim 1 further comprising where said act of executing the algorithm further comprises the acts of:

generating a series of sets of vertices defining specified shapes;

varying the orientation, size, and position of the specified shapes according to different time varying values of provided parameters;

generating polygons to fill in spaces between successively generated shapes to generate a branch.

3. The method of claim 1 further comprising where said act of executing the algorithm further comprises the acts of:

generating a series of sets of vertices, each set defining a 3D object;

varying the orientation, size, and position of the specified 3D objects according to different time varying values of provided parameters, so that they lie along a recursively defined trajectory;

generating polygons to fill in spaces between successively generated shapes to generate a branch.

4. The method of claim 1 where said act of executing the algorithm further comprises the acts of:

calling a first recursion to create a child branch of said branch;

calling a second recursion to create a child of said child branch; and terminating recursions when a specified condition is realized.

5. The method of claim 1 where said act of executing the algorithm further comprises the acts of:

forming a linear combination of sinusoidal function having time varying values of provided audio parameters as coefficients;

sampling the linear combination to obtain a set of sample values;

selecting sets of spaced apart samples as vertex coordinates; and connecting vertices to form an audio generated shape.

6. A system for audio-driven generation of 3D shapes comprising:

an audio analysis block for analyzing a segment of an audio signal to extract time varying audio parameters from the signal;

an object generator block, coupled to the audio analysis block, that generates a set of algorithmically generated shapes determined by provided time varying audio parameters;

an object selection block, coupled to the audio analysis block and the object generator block, for selecting one of the set of generated shapes based on a received time varying value of an audio parameter; and an object positioning block, coupled to the audio analysis block and the object selection block, to place selected objects at locations in a 3D scene determine by time varying values of received audio parameters.

7. The system of claim 6 further comprising:

an object morphing block, coupled to the object selection block and the object selection block, for linear combining two generated shapes in proportion determined by time varying values of received audio parameters.

8. A computer program product comprising:

a computer storage structure having computer program code embodied thereon, said computer program code comprising:

computer program code for causing a computer to analyze a segment of an audio signal to extract time varying audio parameters from the signal;

computer program code for causing a computer to provide said audio parameter to an object rendering algorithm;

computer program code for causing a computer to execute the object rendering algorithm to recursively generate a 3D object based on different time varying values of provided audio parameters; and computer program code for causing a computer to render said 3D object on a display.

9. A method for generating a 3D graphic object comprising the acts of:

analyzing a segment of an audio signal to extract time varying audio parameters from the signal;

providing said audio parameter to an object rendering algorithm;

executing the object rendering algorithm to generate a 3D object based on different time varying values of provided audio parameters;

rendering said 3D object on a display.

* * * * *